ROBERT F. FISHER & S. L. BELL.
Improvement in Liquid-Measuring Device.

No. 127,410.  Patented June 4, 1872.

Robert Francis Fisher.
Solomon Lewis Bell
By their Att'ys
Henry W. William
Att'y.

WITNESSES 127,410

UNITED STATES PATENT OFFICE.

ROBERT F. FISHER, OF BOSTON, AND SOLOMON L. BELL, OF WELLFLEET, MASSACHUSETTS.

IMPROVEMENT IN LIQUID-MEASURING DEVICES.

Specification forming part of Letters Patent No. 127,410, dated June 4, 1872; antedated May 20, 1872.

Specification describing an Improvement in Measures, invented by ROBERT FRANCIS FISHER, of Boston, in the county of Suffolk and State of Massachusetts, and SOLOMON LEWIS BELL, of Wellfleet, in the county of Barnstable and State of Massachusetts.

The first part of our invention relates to a method of obtaining liquid from a vessel by means of a pipe, open at the upper end, and descending or ascending by means of a screw running parallel to it. The second part of our invention relates to a method of registering the amount of liquid drawn from the vessel, as fully described below.

Figure 1:
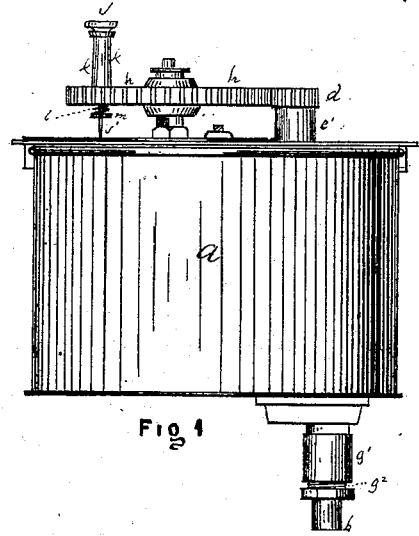
Figure 2:
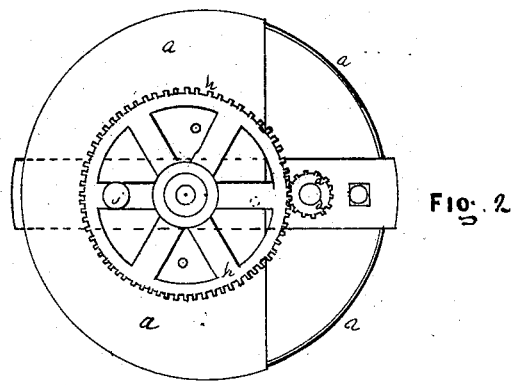
Figure 3:
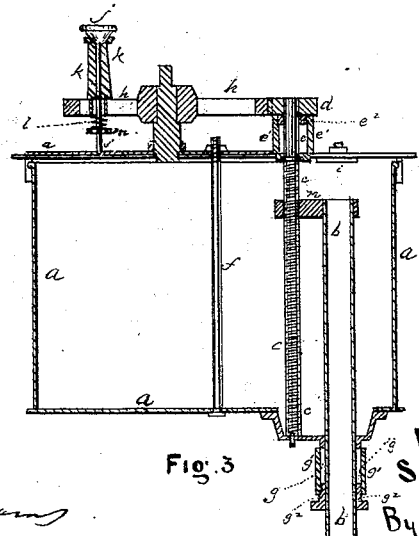

In the accompanying drawing, Figure 1 is an elevation of a measure embodying our invention. Fig. 2 is a plan of the upper side of the same. Fig. 3 is a sectional view.

Similar letters of reference indicate corresponding parts.

$a$ represents a vessel, to which is attached our device. $b$ is a pipe, open at each end, under which is placed the vessel for receiving the liquid. $c$ is a screw running through the vessel $a$ parallel with the pipe $b$. $d$ is a pinion fixed upon the screw $c$. $e^1$ is a box, through which the screw $c$ passes. $e^2$ is a piece screwed into the box $e^1$, and through which the screw $c$ passes. $e$ is a space, formed by the box $e^1$ $e^2$, in which a packing of wicking or something similar is placed. $f$ is a simple rod or post, used to support the top of the vessel, and may be used or dispensed with, as deemed expedient. $g^1$ $g^2$ form the sides and bottom of a box filled with packing, through which runs the pipe $b$. The space produced by the said box is represented by the letter $g$. $h$ is a spur-wheel, into which the pinion $d$ is meshed. $i$ is a washer or pad, against which the pipe $b$ may be pressed and made perfectly tight. $j$ is a spindle. $k$ is a tube through which it extends. $l$ is a spring. $m$ is a nut. The spindle $j$ is pressed down upon the top of the vessel $a$ by means of the spiral spring $l$ and nut $m$, the said nut being fixed to the said spindle. Upon the top of the vessel, in the path of the spindle, are openings, placed at certain distances apart. Whenever the spindle reaches one of these openings it springs in. These openings can be arranged at any required distance or distances apart.

In case any amount of liquid is desired from the vessel the operator takes hold of the spindle, which is attached to the wheel $h$, and turns until the spindle drops into the required opening. The result is readily understood by reference to the drawing—the spindle $j$ turning the wheel $h$, the wheel turning the pinion $d$, the pinion the screw $c$, the screw (by means of an arm, $n$, running upon it) lowering the pipe $b$, and thus letting out the amount of liquid desired.

We can arrange this device with such nicety that we can draw out quantities of liquid ranging from a teaspoonful to a gallon or more. We can attach our device to any vessel with ease. It can be used for measuring any description of wines, liquids, oils, sirups, &c. Our device, as has been proved by actual test, is economical, exact, and durable.

Having thus fully described our invention, what we claim, and desire to secure by Letters Patent, is—

1. The combination and arrangement of the tube $b$, arm $n$, screw $c$, and chambers $g$ and $e$, for the purpose above described, and substantially in the manner hereinbefore specified.

2. The pad or washer $i$, as placed in combination with the tube $b$, arm $n$, and screw $c$, as hereinbefore described.

3. The spindle $j$, tube $k$, and spring and nut $l$ $m$, as combined and arranged with the openings above mentioned, or their equivalent, substantially as and for the purposes above specified.

R. F. FISHER.
S. L. BELL.

Witnesses:
HENRY W. WILLIAMS,
VICTOR C. JUST.